(12) United States Patent
Milligan

(10) Patent No.: US 11,084,969 B2
(45) Date of Patent: Aug. 10, 2021

(54) LOW GLASS TRANSITION TEMPERATURE POLYMER LATEX DRAG REDUCING AGENT

(71) Applicant: LiquidPower Specialty Products Inc., Houston, TX (US)

(72) Inventor: Stuart N. Milligan, Ponca City, OK (US)

(73) Assignee: LiquidPower Specialty Products Inc., Houston, TX (US)

( * ) Notice: Subject to any disclaimer, the term of this patent is extended or adjusted under 35 U.S.C. 154(b) by 0 days.

(21) Appl. No.: 16/278,320

(22) Filed: Feb. 18, 2019

(65) Prior Publication Data

US 2019/0256761 A1    Aug. 22, 2019

Related U.S. Application Data

(60) Provisional application No. 62/632,089, filed on Feb. 19, 2018.

(51) Int. Cl.
| | |
|---|---|
| *C09K 8/524* | (2006.01) |
| *C08F 220/18* | (2006.01) |
| *F17D 1/16* | (2006.01) |
| *C09K 8/035* | (2006.01) |

(52) U.S. Cl.
CPC .......... *C09K 8/524* (2013.01); *C08F 220/18* (2013.01); *C09K 8/035* (2013.01); *F17D 1/16* (2013.01); *C08F 220/1806* (2020.02); *C09K 2208/28* (2013.01)

(58) Field of Classification Search
CPC .... C09K 8/524; C09K 8/035; C09K 2208/28; C09K 8/588; C09K 2208/10; C09K 2208/34; C09K 8/08; C09K 8/12; C09K 8/602; C09K 8/665; C09K 8/68; C09K 8/805; C09K 8/88; F17D 1/16; C08F 220/18; C08F 220/1806
See application file for complete search history.

(56) References Cited

U.S. PATENT DOCUMENTS

| | | | | |
|---|---|---|---|---|
| 5,080,121 A | * | 1/1992 | Malik | C08F 220/18 137/13 |
| 5,110,874 A | * | 5/1992 | Naiman | C09K 3/00 525/329.9 |
| 6,576,732 B1 | * | 6/2003 | Milligan | C08J 3/005 526/347 |
| 2012/0000544 A1 | * | 1/2012 | Bao | F17D 1/16 137/13 |
| 2015/0101673 A1 | | 4/2015 | Milligan | |
| 2015/0291903 A1 | * | 10/2015 | Kommareddi | C08K 5/05 44/395 |

OTHER PUBLICATIONS https://www.sigmaaldrich.com/technical-documents/articles/materials-science/polymer-scie . . . downloaded on Aug. 9, 2020.*
Polymer Products from Aldrich; Thermal Transitions of Homopolymers: Glass Transition & Melting Point; XP55117588A; dated Jan. 1, 2013; 2 total pages.
CBE 4009 Polymer Processing—Thermal Properties; Molecular Parameters Affecting the Glass Transition; XP55584007A; dated Apr. 28, 2019; 40 total pages.
PCT Notification of Transmittal of the International Search Report and the Written Opinion of the International Searching Authority for International Application No. PCT/US2019/018412; dated May 8, 2019; 16 total pages.

* cited by examiner

*Primary Examiner* — Kumar R Bhushan
(74) *Attorney, Agent, or Firm* — Patterson + Sheridan, LLP

(57) ABSTRACT

Implementations described herein generally relate to a drag reducing agent (DRA) for improving flow of crude oils having high asphaltene content through pipelines. The DRA is a terpolymer having a glass transition temperature ($T_g$) of 6 degrees Celsius or below. The terpolymer is formed by a first monomer, a second monomer, and a third monomer. The first and second monomers are chosen based on the glass transition temperatures of corresponding homopolymers. The glass transition temperature of the homopolymer formed with the first monomer is at least 120 degrees Celsius higher than the glass transition temperature of the homopolymer formed with the second monomer. The DRA comprised of the terpolymer formed with the second monomer produces softer solids and fewer solids due to the low glass transition temperature of the terpolymer. The softer solids are more easily handled by the pump to keep the injection system clear.

20 Claims, No Drawings

LOW GLASS TRANSITION TEMPERATURE POLYMER LATEX DRAG REDUCING AGENT

CROSS-REFERENCE TO RELATED APPLICATIONS

This application claims priority to U.S. Provisional Patent Application Ser. No. 62/632,089, filed on Feb. 19, 2018, which is incorporated herein by reference.

BACKGROUND

Field

Implementations described herein generally relate to drag reducing agents for improving flow of crude oils having high asphaltene content through pipelines.

Description of the Related Art

The flow of liquid in a conduit, such as a pipeline, typically results in frictional energy losses. Due to this energy loss, the pressure of the liquid in the conduit decreases along the conduit in the direction of the flow. For a conduit of fixed diameter, this pressure drop increases with increasing flow rate. When the flow in the conduit is turbulent (e.g., Reynold's number greater than about 2100), certain ultrahigh molecular weight polymers can be added to the liquid flowing through the conduit to reduce the frictional energy losses and alter the relationship between pressure drop and flow rate. These polymers are sometimes referred to as drag reducing agents ("DRAs"), and they interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow is possible. DRAs can also decrease the cost of pumping fluids, the cost of equipment used to pump fluids, and provide for the use of a smaller pipe diameter for a given flow capacity. Accordingly, an ongoing need exists to form improved drag reducing materials.

It has been identified that certain polymers, such as copolymers, have good affinity for crude oils having high asphaltene contents (three weight percent or more), and these polymers are effective DRAs in asphaltenic crude oils. However, these polymers form hard, brittle solids when pumped into the pipeline, leading to plugged downstream equipment.

Therefore, an improved DRA for crude oils having high asphaltene content is needed.

SUMMARY

Implementations described herein generally relate to drag reducing agents for improving flow of crude oils having high asphaltene content through pipelines. In one implementation, a composition for improving flow of crude oils having asphaltene contents of three percent of higher in pipelines, the composition including a terpolymer having a glass transition temperature of six degrees Celsius or below, and a continuous phase.

In another implementation, a drag reducing agent including a terpolymer formed by a first monomer, a second monomer, and a third monomer, wherein the first monomer is capable of forming a homopolymer having a first glass transition temperature, the second monomer is capable of forming a homopolymer having a second glass transition temperature, wherein the second glass transition temperature is at least 120 degrees Celsius lower than the first glass transition temperature.

In another implementation, a drag reducing agent including a terpolymer including a terpolymer comprising five to 45 mole percent of a first monomer, 10 to 70 mole percent of a second monomer, and 10 to 80 mole percent of a third monomer, wherein the first monomer is selected from the group consisting of styrene, 4-methylstyrene, 4-(tert-butyl) styrene, benzyl methacrylate, phenyl methacrylate, and methyl methacrylate, the second monomer is selected from the group consisting of 2-ethylhexyl acrylate, n-butyl acrylate, and isodecyl acrylate.

DETAILED DESCRIPTION

Implementations described herein generally relate to a drag reducing agent (DRA) for improving flow of crude oils having high asphaltene content through pipelines. The DRA is a terpolymer having a glass transition temperature ($T_g$) of 6 degrees Celsius or below. The terpolymer is formed by a first monomer, a second monomer, and a third monomer. The first and second monomers are chosen based on the glass transition temperatures of corresponding homopolymers. The glass transition temperature of the homopolymer formed with the first monomer is at least 120 degrees Celsius higher than the glass transition temperature of the homopolymer formed with the second monomer. The DRA comprised of the terpolymer formed with the second monomer produces softer solids and fewer solids due to the low glass transition temperature of the terpolymer. The softer solids are more easily handled by the pump to keep the injection system clear. Fewer solids lead to minimized plugging of downstream equipment.

Different aspects, implementations and features are defined in detail herein. Each aspect, implementation or feature so defined may be combined with any other aspect(s), implementation(s) or feature(s) (preferred, advantageous or otherwise) unless clearly indicated to the contrary.

As used herein, the singular forms "a," "an," and "the" include plural referents unless the context clearly indicates otherwise.

As used herein, the terms "comprising," "including" and "having" are intended to be inclusive and mean that there may be additional elements other than the listed elements.

In one implementation, the liquid hydrocarbon can comprise asphaltene compounds. As used herein, "asphaltenes" are defined as the fraction separated from crude oil or petroleum products upon addition of pentane. While difficult to characterize, asphaltenes are generally thought to be high molecular weight, non-crystalline, polar compounds, which exist in crude oil. In one implementation, the liquid hydrocarbon can comprise asphaltene compounds in an amount of at least about three weight percent, in the range of from about four to about 35 weight percent, or in the range of from five to 25 weight percent. Examples of asphaltenic crude oils include, but are not limited to, Merey heavy crude, Petrozuata heavy crude, Corocoro heavy crude, Albian heavy crude, Bow River heavy crude, Maya heavy crude, and San Joaquin Valley heavy crude.

The flow of asphaltenic crude oils in pipelines can be improved by a DRA. In one implementation, the DRA is an ultrahigh molecular weight terpolymer having a glass transition temperature ($T_g$) of six degrees Celsius or below. The glass transition temperature of the ultrahigh molecular weight polymer is calculated using the Fox Equation:

$$\frac{1}{T_g} = \left(\frac{w_1}{T_{g1}}\right) + \left(\frac{w_2}{T_{g2}}\right) + \ldots \left(\frac{w_x}{T_{gx}}\right)$$

where w is the weight fraction of monomers 1 through x in the copolymer, and the numbered $T_g$ values (Kelvin) are the glass transition temperatures for the homopolymers of the corresponding monomer components. In one implementation, the DRA is a terpolymer formed by a first monomer, a second monomer, and a third monomer. The first, second, and third monomers correspond to different repeating units of the terpolymer. The first monomer is capable of forming a homopolymer having a first glass transition temperature. The polymerization conditions for forming the homopolymer are the same as the polymerization conditions for forming the terpolymer. The second monomer is capable of forming a homopolymer having a second glass transition temperature under the same polymerization conditions as the terpolymer. In one implementation, the first glass transition temperature is at least 90 degrees Celsius higher than the second glass transition temperature. For example, the first glass transition temperature is about 90 degrees Celsius to about 180 degrees Celsius higher than the second glass transition temperature. In one implementation, the first glass transition temperature is at least 120 degrees Celsius higher than the second glass transition temperature. For example, the first glass transition temperature is about 120 degrees Celsius to about 180 degrees Celsius higher than the second glass transition temperature. In one implementation, the first glass transition temperature is about 120 degrees Celsius to about 150 degrees Celsius higher than the second glass transition temperature. The third monomer may be any suitable monomer, and the homopolymer formed with the third monomer under the same polymerization conditions as the terpolymer may have a glass transition temperature in between those of the first and second monomers. The first monomer imparts a high glass transition temperature to the terpolymer. It has been found that hard, brittle solids formed during pumping of a conventional DRA including the homopolymer or copolymer formed with the first monomer is the direct result of the higher glass transition temperature of the homopolymer or copolymer, and the hard, brittle solids more readily block check valves or other downstream equipment.

In order to reduce the amount of and to soften the hard, brittle solids while maintaining the amount of drag reduction in the asphaltenic crude oils, the second monomer is included in the polymerization of the terpolymer. The second monomer is capable of forming a homopolymer having a glass transition temperature that is at least 120 degrees Celsius lower than that of a homopolymer that the first monomer is capable of forming. The DRA comprised of the terpolymer formed with the second monomer produces softer solids and fewer solids due to the low glass transition temperature of the terpolymer. The softer solids are more easily handled by the pump to keep the injection system clear. Fewer solids lead to minimized plugging of downstream equipment. The second monomer may be chemically similar to the third monomer, except the second monomer is capable of forming a homopolymer having a glass transition temperature that is lower than a homopolymer that the third monomer is capable of forming. In some implementations, the second monomer, on its own, may negatively affect the amount of drag reduction in the asphaltenic crude oils. Thus, the DRA comprising the terpolymer may have a specific mole percentage of each monomer in order to maximize the reduction and softening of the hard, brittle solids while minimize the effect on the amount of drag reduction in the asphaltenic crude oils. In one implementation, the terpolymer comprises five to 45 mole percent of the first monomer, 15 to 70 mole percent of the second monomer, and 10 to 80 mole percent of the third monomer. In another implementation, the terpolymer comprises 10 to 40 mole percent of the first monomer, 20 to 60 mole percent of the second monomer, and 15 to 70 mole percent of the third monomer. In another implementation, the terpolymer comprises 10 to 35 mole percent of the first monomer, 25 to 50 mole percent of the second monomer, and 25 to 65 mole percent of the third monomer.

The first monomer may include an aromatic ring, and examples of the first monomer include styrene, 4-methylstyrene, 4-(tert-butyl) styrene, benzyl methacrylate, and phenyl methacrylate. In one implementation, the first monomer is methyl methacrylate. In one implementation, the first monomer is styrene, and the styrene monomer is capable of forming polystyrene having a first glass transition temperature of about 100 degrees Celsius. The second monomer is 2-ethylhexyl acrylate, and the 2-ethylhexyl acrylate monomer is capable of forming poly(2-ethylhexyl acrylate) having a second glass transition temperature of about negative 50 degrees Celsius. Thus, the first glass transition temperature is about 150 degrees higher than the second glass transition temperature. The third monomer is 2-ethylhexyl methacrylate, and the 2-ethylhexyl methacrylate monomer is capable of forming poly(2-ethyhexyl methacrylate) having a third glass transition temperature of about negative 10 degrees Celsius. The third monomer may be a general-purpose base monomer for constructing poly(meth)acrylate DRAs, such as 2-ethylhexyl methacrylate. The second monomer, 2-ethylhexyl acrylate, may be chemically similar to the third monomer, and homopolymer of the second monomer has a glass transition temperature lower than that of homopolymer of the third monomer. Other suitable compounds for the second monomer may include n-butyl acrylate, benzyl acrylate, and isodecyl acrylate. In one implementation, the terpolymer comprises five to 45 mole percent of styrene, 15 to 70 mole percent of 2-ethylhexyl acrylate or n-butyl acrylate, and 10 to 80 mole percent of 2-ethylhexyl methacrylate, and the terpolymer has a glass transition temperature ranging from about negative 38 degrees Celsius to about 6 degrees Celsius. In another implementation, the terpolymer comprises 10 to 35 mole percent of styrene, 25 to 50 mole percent of 2-ethylhexyl acrylate or n-butyl acrylate, and 25 to 65 mole percent of 2-ethylhexyl methacrylate, and the terpolymer has a glass transition temperature ranging from about negative 28 degrees Celsius to about negative six degrees Celsius. With the terpolymer having a glass transition temperature of six degrees Celsius or below, fewer and softer solids are produced when the terpolymer is used as a DRA.

The terpolymer used as a DRA may be dispersed in an aqueous continuous phase. The terpolymer can be prepared via emulsion polymerization of a reaction mixture comprising monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture can also comprise a buffer. Additionally, the continuous phase can optionally comprise a hydrate inhibitor.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroyl sarcosinate available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly(ethyleneoxy)ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-3-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one implementation, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another implementation, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one implementation, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

In forming the reaction mixture, the monomers, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60 degrees Celsius, in the range of from about 0 to about 45 degrees Celsius, or in the range of from 0 to 30 degrees Celsius. The system pressure can be maintained in the range of from about 5 to about 100 psia, in the range of from about 10 to about 25 psia, or about atmospheric pressure.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

In one implementation, the terpolymer has a weight average molecular weight ($M_w$) of at least about $1 \times 10^6$ g/mol, at least about $2 \times 10^6$ g/mol, or at least $5 \times 10^6$ g/mol. The continuous phase can have a pH in the range of from about 4 to about 10, or in the range of from about 6 to about 8, and contains few if any multi-valent cations. In one implementation, the terpolymer can comprise at least about 10,000, at least about 25,000, or at least 50,000 repeating units selected from the residues of the first, second and third monomers.

The terpolymer can be added to the liquid hydrocarbon, such as the asphaltenic crude oils, in an amount sufficient to yield a terpolymer concentration in the range of from about 0.1 to about 500 ppmw, in the range of from about 0.5 to about 200 ppmw, in the range of from about 1 to about 100 ppmw, or in the range of from 2 to 50 ppmw. In one implementation, at least about 50 weight percent, at least about 75 weight percent, or at least 95 weight percent of the terpolymer can be dissolved by the liquid hydrocarbon. In another implementation, the viscosity of the liquid hydrocarbon treated with the terpolymer is not less than the viscosity of the liquid hydrocarbon prior to treatment with the terpolymer.

EXAMPLES

Chemicals: The monomers, 2-ethylhexyl methacrylate (Evonik), 2-ethylhexyl acrylate (Sigma-Aldrich), and styrene (Lyondell), were used without further purification. Sodium dodecyl sulfate (Polystep® B-5, Stepan Chemicals), ammonium persulfate (APS, Aldrich), iron (II) sulfate heptahydrate (Aldrich), ethylene glycol (Univar), Tergitol® 15-S-7 (Dow), tert-butyl hydroperoxide (TBHP, Aldrich, 70%), sodium phosphate dibasic (Aldrich), and potassium phosphate monobasic (Aldrich) were all used without further purification. Type I water used in all experiments was prepared using a Millipore water system.

Polymerization: Emulsion polymerizations were carried out under nitrogen in jacketed glass 300-mL or 1000-mL kettles. The experimental target conditions were 40% polymer, approximately 5% total surfactant (1.2% Sodium dodecyl sulfate, 4% Tergitol® 15-S-7), and 5 degrees Celsius starting temperature. The redox initiator system was ammonium persulfate initiator and iron (II) sulfate ($FeSO_4$) activator. All the ammonium persulfate was added at once, after which the $FeSO_4$ activator was added as a solution using a syringe pump over an 18 hour period. The redox chaser system utilized an "oil-soluble" initiator (TBHP) added all at once followed by the activator ($FeSO_4$) added as a solution using a syringe pump over a two hour period. The total reaction time, initiation plus chaser plus hold time, was about 24 hours.

Example Polymerization: A 1000 mL jacketed reaction kettle with a condenser, mechanical stirrer, thermocouple, septum ports, and nitrogen inlet/outlet was set up. The kettle was charged with a buffer/surfactant solution (465.20 g: sodium phosphate dibasic—0.184%; potassium phosphate monobasic—0.177%; sodium dodecyl sulfate—2.13%; Tergitol® 15-S-7—7.08%; ethylene glycol—37.4%; water—balance) and purged with nitrogen for at least one hour (0.4 lpm). Separately, the monomers were purged with nitrogen for at least one hour. The kettle was charged with 2-ethylhexyl methacrylate (185.22 g), 2-ethylhexyl acrylate (86.47 g), and styrene (48.59 g) by cannula using inert atmosphere techniques. Stirring was initiated at 450 rpm and the reactor cooled to about 5 degrees Celsius by circulating fluid through the jacket. When the reaction mixture reached 5 degrees Celsius, APS solution (1.0 mL, 0.912 wt % APS) was added in one portion and stirred for a few minutes. Following this, iron (II) sulfate solution (5.0 mL, 0.245 wt % $FeSO_4$) was added to the reactor over an 18-hour period using a syringe pump. After completion of the initiation phase, the chaser phase commenced with the addition of TBHP (1.0 mL, 0.367 wt % TBHP) added all at once and stirred for a few minutes. This was followed by $FeSO_4$ solution (1.0 mL, 1.22 wt % $FeSO_4$) added over a two hour period using a syringe pump. At the end of the chaser addition, the polymerization was allowed to stir for a short time and isolated.

While the foregoing is directed to implementations of the present disclosure, other and further implementations of the present disclosure may be devised without departing from the basic scope thereof, and the scope thereof is determined by the claims that follow.

I claim:

1. A drag reducing agent, comprising:
a terpolymer comprising 5 to 45 mole percent of a first monomer, 10 to 70 mole percent of a second monomer, and 10 to 80 mole percent of a third monomer, wherein the first monomer is styrene, the second monomer is 2-ethylhexyl acrylate, and the third monomer is 2-ethylhexyl methacrylate.

2. The drag reducing agent of claim 1, wherein the terpolymer has a glass transition temperature of six degrees Celsius or below.

3. The drag reducing agent of claim 2, wherein the glass transition temperature of the terpolymer ranges from about negative 38 degrees Celsius to about six degrees Celsius.

4. The drag reducing agent of claim 1, wherein the terpolymer comprises 10 to 40 mole percent of styrene, 20 to 60 mole percent of 2-ethylhexyl acrylate, and 15 to 70 mole percent of 2-ethylhexyl methacrylate.

5. The drag reducing agent of claim 1, wherein the terpolymer comprises 10 to 35 mole percent of styrene, 25 to 50 mole percent of 2-ethylhexyl acrylate, and 25 to 65 mole percent of 2-ethylhexyl methacrylate.

6. The drag reducing agent of claim 5, wherein the glass transition temperature of the terpolymer ranges from about negative 28 degrees Celsius to about negative six degrees Celsius.

7. The drag reducing agent of claim 1, wherein the terpolymer has a weight average molecular weight of at least about $1 \times 10^6$ g/mol.

8. The drag reducing agent of claim 1, wherein the terpolymer has a weight average molecular weight of at least about $5 \times 10^6$ g/mol.

9. The drag reducing agent of claim 1, wherein the terpolymer comprises about 50 mole percent of the 2-ethylhexyl methacrylate.

10. The drag reducing agent of claim 1, wherein the terpolymer comprises about 50 mole percent of 2-ethylhexyl methacrylate, about 25 mole percent of 2-ethylhexyl acrylate, and about 25 mole percent of styrene.

11. The drag reducing agent of claim 1, wherein the drag reducing agent improves the flow of crude oils having an asphaltene content of three percent or higher.

12. A drag reducing agent, comprising:
a terpolymer, consisting essentially of:
10 to 35 mole percent of styrene;
25 to 50 mole percent of 2-ethylhexyl acrylate; and
25 to 65 mole percent of 2-ethylhexyl methacrylate.

13. The drag reducing agent of claim 12, wherein the terpolymer has a glass transition temperature ranging from about −28 degrees Celsius to about −6 degrees Celsius.

14. The drag reducing agent of claim 12, wherein the terpolymer has a weight average molecular weight of at least about $1 \times 10^6$ g/mol.

15. The drag reducing agent of claim 12, wherein the terpolymer has a weight average molecular weight of at least about $5 \times 10^6$ g/mol.

16. The drag reducing agent of claim 12, wherein the terpolymer consists of about 50 mole percent of the 2-ethylhexyl methacrylate.

17. The drag reducing agent of claim 12, wherein the terpolymer comprises at least about 25,000 repeating units selected from the styrene, the 2-ethylhexyl acrylate, and the 2-ethylhexyl methacrylate.

18. A drag reducing agent, comprising:
   a terpolymer, comprising:
      about 50 mole percent of 2-ethylhexyl methacrylate;
      about 25 mole percent of 2-ethylhexyl acrylate; and
      about 25 mole percent of styrene.

19. The drag reducing agent of claim 18, wherein the terpolymer has a glass transition temperature ranging from about −28 degrees Celsius to about −6 degrees Celsius.

20. The drag reducing agent of claim 18, wherein the terpolymer has a weight average molecular weight of at least about $1\times10^6$ g/mol.

* * * * *